United States Patent
Legré et al.

(10) Patent No.: US 10,999,069 B2
(45) Date of Patent: May 4, 2021

(54) APPARATUS AND METHOD FOR DIRECT QUANTUM CRYPTOGRAPHY SYSTEM IMPLEMENTATION OVER WDM TELECOMMUNICATION NETWORK

(71) Applicant: ID QUANTIQUE SA, Carouge (CH)

(72) Inventors: Matthieu Legré, Veigny-Foncenex (FR); Damien Stucki, Geneva (CH)

(73) Assignee: ID QUANTIQUE SA, Carouge (CH)

( * ) Notice: Subject to any disclaimer, the term of this patent is extended or adjusted under 35 U.S.C. 154(b) by 58 days.

(21) Appl. No.: 16/338,649

(22) PCT Filed: Oct. 3, 2017

(86) PCT No.: PCT/EP2017/075043
§ 371 (c)(1),
(2) Date: Apr. 1, 2019

(87) PCT Pub. No.: WO2018/065393
PCT Pub. Date: Apr. 12, 2018

(65) Prior Publication Data
US 2020/0044835 A1    Feb. 6, 2020

(30) Foreign Application Priority Data

Oct. 3, 2016 (EP) ..................................... 16192115

(51) Int. Cl.
*H04L 9/08* (2006.01)
*H04B 10/079* (2013.01)
*H04B 10/70* (2013.01)

(52) U.S. Cl.
CPC ..... *H04L 9/0855* (2013.01); *H04B 10/07953* (2013.01); *H04B 10/07955* (2013.01); *H04B 10/70* (2013.01)

(58) Field of Classification Search
CPC ............ H04L 9/0855; H04B 10/07953; H04B 10/07955; H04B 10/70
(Continued)

(56) References Cited

U.S. PATENT DOCUMENTS

| 4,958,354 A | * | 9/1990 | Urakami | ................. | H05B 47/10 |
|---|---|---|---|---|---|
| | | | | | 372/29.014 |
| 2003/0166394 A1 | * | 9/2003 | Tsien | .................... | H04L 1/0002 |
| | | | | | 370/468 |

(Continued)

OTHER PUBLICATIONS

Patrick Eraerds et al : "Quantum key distribution and 1 Gbit/s data encryption over a single fibre", arxiv.org, Cornell University Library, 201 Olin Library Cornell University Ithaca, NY 14853,Dec. 9, 2009 (Dec. 9, 2009), XP080381539.
(Continued)

*Primary Examiner* — Dant B Shaifer Harriman
(74) *Attorney, Agent, or Firm* — Dinsmore & Shohl LLP

(57) ABSTRACT

The invention relates to a QKD System Active combiner (200) adapted to be installed in a QKD apparatus, said QKD apparatus comprising an emitter (100), a receiver (110) and QKD systems (102/112), wherein the emitter (100) is adapted to send communication signals to the receiver (110) through the QKD System Active combiner (200), characterized in that the QKD System Active combiner (200) comprises an active attenuation system comprising a processing unit (230) adapted to automatically control at least one variable optical attenuator (150) through a control channel (290) in order to control an attenuation of a signal to be sent to the receiver, and a detector/monitor (240) adapted to monitor the intensity of the signal downstream the attenuation, and wherein the processing unit is adapted to control the variable optical attenuator (150) based on a
(Continued)

QBER information or an intensity of a signal received by the receiver, sent by the QKD systems (112) through a classical channel (250).

12 Claims, 7 Drawing Sheets

(58) Field of Classification Search
USPC .......................................................... 380/283
See application file for complete search history.

(56) References Cited

U.S. PATENT DOCUMENTS

| | | |
|---|---|---|
| 2004/0136709 A1 | 7/2004 | Yang et al. |
| 2015/0304052 A1* | 10/2015 | Schemmann ........ H04B 10/807 398/68 |
| 2016/0241936 A1 | 8/2016 | Nagamine et al. |

OTHER PUBLICATIONS

Yoshino K et al : "Long-term field demonstration of WDM quantum key distribution system with stabilization control", 2013 Con Ference on Lasers and Electro-Optics Pacific Rim (CLEOPR) , IEEE, Jun. 30, 2013 (Jun. 30, 2013), pp. 1-2, XP032481875,DOI: 10.1109/CLEOPR.2013.6600228.

Aki Hiro Tanaka et al : "High-Speed Quantum Key Distribution System for 1-Mbps Real-Time Key Generation" , IEEE Journal of Quantum Electronics, IEEE Service Center, Piscataway, NJ , USA, vol. 48, No. 4, Apr. 1, 2012 (Apr. 1, 2012), pp. 542-550, XP011421468, ISSN: 0018-9197, DOI:10.1109/JQE .2012.2187327.

Sasaki Masahide et al : "Quantum Photonic Network: Concept, Basic Tools, and Future Issues" , IEEE Journal of Selected Topics in Quantum Electronics, IEEE Service Center, Piscataway, NJ , US, vol. 21, No. 3, May 1, 2015 (May 1, 2015), pp. 1-13, XP011567918, ISSN: 1077-260X, DOI: 10.1109/JSTQE .2014.2369507, [Jun. 2015], 6400313.

International Search Report for Application No. PCT/EP2017/075043 dated Jan. 11, 2018.

* cited by examiner

Figure 1 – prior art

APPARATUS AND METHOD FOR DIRECT QUANTUM CRYPTOGRAPHY SYSTEM IMPLEMENTATION OVER WDM TELECOMMUNICATION NETWORK

TECHNICAL FIELD

The present invention relates to Quantum Cryptography based on Quantum Key Distribution (QKD) and wavelength-division multiplexed (WDM) network infrastructure to provide secure data transmission.

BACKGROUND AND PRIOR ART

Quantum Key Distribution involves establishing a key between a sender ("Alice") and a receiver ("Bob") by using either single-photons or weak (e.g., 0.1 photon on average) optical signals (pulses) called "qubits" or "quantum signals" transmitted over a "quantum channel". Unlike classical cryptography whose security depends on computational complexity, the security of quantum cryptography is based on many quantum mechanical principles among which the quantum mechanical principle that any measurement of a quantum system in an unknown state will modify its state. Consequently, an eavesdropper ("Eve") that attempts to intercept or otherwise measure the exchanged qubits introduces errors that reveal her presence.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175-179 (IEEE, New York, 1984). Specific QKD systems are described in U.S. Pat. No. 5,307,410 to Bennett, and in the article by C. H. Bennett entitled "Quantum Cryptography Using Any Two Non-Orthogonal States", Phys. Rev. Lett. 68 3121 (1992). The general process for performing Quantum Key Distribution is described in the book by Bouwmeester et al., "The Physics of Quantum Information," Springer-Verlag 2001, in Section 2.3, pages 27-33. Quantum cryptography has been interdisciplinary developed between the scientific fields of quantum physics, quantum optics, information theory, cryptography and informatics. A survey of the bases and methods as well as the historical development of quantum cryptography is contained in the articles by N. Gisin, G. Ribordy, W. Tittel and H. Zbinden, "Quantum Cryptography", Reviews of Modern Physics. 74, 145 (2002). Quantum cryptography or Quantum Key Distribution (QKD) is a method allowing the distribution of a secret key between two distant parties, the emitter and the receiver, with an information-theoretically provable security as it relies on Quantum physics principles.

As already mentioned above, the security of this method comes from the well-known fact that the measurement of the quantum state of an unknown quantum system modifies the system itself, therefore, a spy eavesdropping on the quantum communication channel cannot get information on the key without introducing errors in the key exchanged between the emitter and the receiver such that eavesdropping attempts can be detected.

In the following sections, the term "channel" should be understood in a generic sense: a physical medium which can transmit a modulation of some physical property such as an optical signal with a specific intensity. It has to be noted that the term "channel" has a second meaning that is a logical connection over a multiplexed medium. For example, a radio channel is not a physical medium but a signal having a specific wavelength or being within a specific wavelength range. In the specification below, the term channel may be used for both signification, however the context shall make clear to which signification it relates.

A typical implementation of a cryptographic application based on QKD consists in a cryptographic application running between two remote locations. This implementation involves at least a pair of Quantum Key Distribution devices and a pair of cryptographic application devices using the secret keys exchanged through QKD. One device of each pair is installed in one location, whereas the other device is in the other location. The QKD devices are connected by a quantum communication channel, implemented by an optical fiber and a bidirectional classical communication channel implemented by a second separated optical fiber. This classical communication channel used by the QKD system will be called service channel in the following paragraphs. The pair of cryptographic application devices is connected by a second bidirectional classical communication channel. This classical communication channel used by the cryptographic application will be called data channel in the following paragraphs. Eavesdropping detection is done on the quantum channel (as it consists in the quantum particles) and not on the service channel nor on the data channels running in parallel to the quantum channel.

Several implementation options are possible for the quantum and service channels in Quantum Key Distribution systems. The most common is the use of separated physical media to carry those communications channels. Note that the physical medium used to carry optical communication channels is made of optical fibers in general. However, other media are possible like e.g. free-space propagation. In the case of communication channels carried by separated optical fibers, the optical fiber, which is dedicated to the quantum channel, is called dark fiber. The bidirectional service channel is carried by two separated optical fibers too. Each fiber carries one direction of the communication channel. In this option, there are no interactions between the different channels because they are carried by physically separated medium.

In order to have a communication channel which works correctly, it is important that the signal to noise ratio of the received logical signal is large enough. One of the effects of optical fibers on both quantum and classical optical logical signals is the attenuation of these signals along their propagation. This means that the signal level decreases when this signal propagates in an optical fiber. On the other hand, the noise in both quantum and classical channels is mainly due to the noise of the detection system. So, the noise level is independent from the propagation distance within the optical fiber. Therefore, the signal to noise ratio of both communication channel types decreases if the propagation distance of the signal increases. This effect leads to a maximum propagation distance (or a maximum loss value) over which a channel can work. In the case of classical communication channels, the parameter, which is used to determine if the channel has a signal to noise ratio good enough, is the optical intensity of the signal reaching the receiver. If the value of this parameter is in a predetermined range specified by the manufacturer, the channel will work correctly. In the case of quantum communication channels, the parameter, which is used to determine if the channel has a signal to noise ratio good enough, is called quantum bit error rate (QBER). This parameter is somehow the inverse of the signal to noise ratio. The QBER value is measured by QKD systems. When the QBER value is above a predefined threshold value, the QKD system cannot generate any secret keys from the qubit exchange. The higher the QBER value, the larger the error rate with respect to the signal rate. An increase of the error rate can be due either to a decrease of the quantum signal, or to a modification of some QKD system parameters (for example a temperature system fluctuation that modifies the alignments of the optical system, or a change of the intrinsic noise of the single photon detectors in the QKD receiver) or to an eavesdropping attempt.

Since several years Wavelength Division Multiplexing (WDM) techniques have been investigated to reduce the number of optical fibers that are need in order to run cryptographic applications based on QKD. WDM techniques are used for sharing the same optical fiber between several classical communication channels for few decades. These techniques are based on the affectation of a specific wavelength to each classical channel. In general each communication direction of each channel has its own wavelength. By using component called WDM combiner, it is possible to combine all the wavelengths so that all channels are carried by the same optical fiber. At the end of this fiber, a WDM splitter is used to separate the channels with different wavelengths and send them out from defined output ports. The same techniques can be extended to a combination of quantum and classical communication channels within the same optical fiber. In this case, quantum optical signals (i.e. single photons) propagate in the same fiber than classical signals (i.e. intense optical pulses composed of a large number of photons, e.g. 10'000).

WDM configurations mixing Quantum Key Distribution and classical communications have been explored since the late 90's with the seminal work of Townsend (Townsend & al., 97). An exemplary embodiment of Quantum Key Distribution system sharing the same optical fiber than classical data transmission systems using Wavelength Division Multiplexing technology is presented in FIG. 1. As one can see in this figure, it usually comprises an emitter 100 and a receiver 110 connected through an optical fiber 130. Both emitter 100 and receiver 110 embed a plurality of data transmission terminals 101, 111 as well as several QKD systems 102, 112. Each data transmission terminal 101 on emitter 100 side is connected to an associated data transmission terminal 111 on receiver 110 side through a classical communication channel. Similarly, each QKD system 102 on emitter 100 side is connected to an associated QKD system 112 through a quantum communication channel and a classical communication channel. Each of those quantum or classical channel is associated to a dedicated wavelength value (or a dedicated pair of wavelength values if the channel is bidirectional). The quantum or classical optical signals implementing a quantum or classical channel are sent from emitter 100 to a wavelength combiner 121 (or wavelength multiplexer) through an optical fiber. This fiber is indexed as 103 for a data channel, 104 for a quantum channel and 105 for a service channel. Wavelength combiner 121 combines all the optical signals with different wavelengths coming from different optical fibers in the same optical fiber 130. At this stage all the communication channels are carried by the same optical fiber 130 and are spectrally separated. Wavelength splitter 122 (or wavelength demultiplexer) located at the end of optical fiber 130 allows the physical separation of all communication channels. Each wavelength is directed to a dedicated optical fiber. This optical fiber corresponding to a specific wavelength value is connected to appropriate data transmission terminal 111 or QKD system 112. This fiber is indexed as 113 for a data channel, 114 for a quantum channel and 115 for a service channel.

One of the main issues of WDM techniques applied to quantum and classical signals is that classical channel signals may generate noise in the quantum communication channels due to the fact that the classical channel signal intensity is much higher than the single photon level of quantum signals. This increase of noise in the quantum channels leads to an increase of the QBER values that might be above the threshold value allowing the secret key generation.

There are two reasons for this increase of noise in the quantum channels due to the presence of the classical channels in the optical fiber.

1—The first one is defined as channel cross-talk. Channel cross-talk is characterized by an imperfect physical separation of the wavelengths by the wavelength splitter. The cross-talk quality is quantified by the insertion loss (or isolation of one channel compare to another one) experienced by an optical signal at wavelength L1 when it goes out from the optical fiber (113 or 114 or 115) corresponding to the wavelength L2. To avoid that cross-talk forbids the secret key exchange, large isolation values (e.g. >80 dB) must be guaranteed by wavelength splitter 122. The cross-talk is a linear optical effect. This means that all the optical intensity at the wavelength L1 at the entrance of optical fiber 130 is still at the same wavelength L1 at the entrance of wavelength splitter 112.

2—The second reason for an increase of the noise in quantum channels due to the presence of classical channel is non-linear effects in this fiber. In this case, the optical intensity at the wavelength L1 at the entrance of optical fiber 130 has another wavelength than L1 (e.g. L2) at the entrance of wavelength splitter 112. Therefore, this optical intensity will be guided towards the output fiber (113 or 114 or 115) corresponding to L2 and not to L1. There are no spectral way to distinguish between the quantum signals and the noise coming from the classical channels. The most common non-linear effect in optical fibers that affects quantum channels is called Raman Scattering.

The standard way to limit the impact of Raman scattering of classical channels on the quantum channels sharing the same optical fiber is to reduce the optical intensity of those classical channels. This is the reason why, as shown in FIG. 1, classical optical signals may be attenuated by variable optical attenuator (VOA) 150 till an optical power value allowing the proper working of the quantum channels. If the optical power of the classical communication channels is too low on receiver 110 side, the classical signals can be amplified by an optical amplifier 160 till the optical power on the receiver is in the range of optical power allowing the proper working of the classical channel. These two specific issues are tackled through the prior art with specific implementations provided in U.S. Pat. No. 7,248,695 disclosing a set-up where a deep-notch optical filtering is applied to the classical signals prior to their being multiplexed with the quantum signals to prevent noise generated by the classical signals at the quantum signal wavelength from adversely affecting transmission of quantum signals in the transmission optical fiber.

US20080273703 describes an apparatus overcoming the issues related to forward/backward Raman scattering and Rayleigh scattering by optically and electronically gating the Single Photons Detectors in the system in a manner that significantly reduces noise from scattered photons.

Eraerds & al., 2010 shares experiments based on 1 Gbps data encryption over one single fiber and challenges relating to multiplexing quantum, service and data channels. In that case, VOA's 150 are used to control the optical power of data channels at the entrance of the WDM combiner 121 in order to limit the impact of Raman scattering on quantum signal when both classical and quantum signals propagate in optical fiber 130.

However, the main technical issues tackled above are related to a pre-defined set of quantum and classical communication channels with no dynamic evolution in the implementation. In some applications of these implementations, it is of particular interest for users to be able to add or remove data transmission terminals and/or QKD systems from the Wavelength Division Multiplexing infrastructure. For example, adding a data channel may be justified when a user wants to increase the amount of data and/or the data type (e.g.: video, audio, databases) to be exchanged between the emitter and the receiver, on the other hand it can be useful to remove a channel if a data channel is no more needed. As an example, adding a classical channel increases the intensity level of Raman scattering in optical fiber 130, which by consequence may lead to an increase of the QBER to a value above the threshold allowing secret key exchanges. Therefore, each time a channel is added, the settings on VOA's 150 and optical amplifiers 160 need to be adjusted in order to ensure the proper working of both quantum and classical channels. Nevertheless, realizing an adjustment is a challenging step as it may lead to the interruption of the data channels that are already in production and thus affect the whole network operation.

For this reason, a manual adaptation of the actual number of channels is often required in order to ensure that both the QKD systems and data transmission terminals are properly operating when a data or quantum channel is added or removed from the Wavelength Division Multiplexing telecom infrastructure. This manual adaptation is time-consuming and expensive as it requires an operator intervention. Therefore, it would be of particular interest to have a device enabling QKD and classical communications proper operation when adding or removing a channel. This is the main object of this invention.

SUMMARY OF THE INVENTION

A main object of the present invention is to provide a dynamic adaptation device enabling QKD and Data transmission terminal communications proper operation when a WDM communication network architecture changes e.g when adding or removing a channel.

The above objects of invention are achieved by an apparatus and a method as described in the preamble and description, which is further characterized in that it enables to overcome overall system shutdown risk when adding or removing a data or quantum link.

The main benefits of the present invention are an automatic implementation of QKD infrastructure within Classical telecom infrastructure exploiting WDM set-up. Therefore, this set-up enables to dynamically adapt on one hand the data and classical communication attenuation at the emitter and the data and classical signal amplification at the receiver. By doing so, when a channel is added or removed, the system performs attenuation and/or amplification signal cycles in order to define the attenuation and amplification signal values that enable both data transmission and quantum key distribution through QKD systems.

One of the general feature of the invention is to connect the emitter to a QKD System Active combiner and the Receiver to a QKD System Active Splitter enabling to adapt signal attenuation and gain depending on the number of channels used by the Emitter 100 and Receiver 110 for communication. By doing so the system is capable to ensure system proper operation when the set-up is modified that is to say when a communication channel is added or removed the QKD systems are still able to synchronize and exchange keys and data transmission terminals are able to continuously operate without interruption. Additionally, when a quantum channel is added or removed, QKD systems are still able to synchronize and exchange keys at a defined key rate and Data transmission terminals are able to continuously operate without interruption.

Another object of the invention is to provide an eavesdropping detection method for a QKD-WDM System that can discriminate an eavesdropping attempt from a failure due to improper attenuation/amplification.

For this reason, a first aspect of the present invention relates to an active channel attenuation/amplification device to be implemented in a QKD system, comprising at least one processing unit adapted to receive a computed a QBER value through a first dedicated communication link and a computed working status of a classical channel through a second dedicated communication link, said processing unit being adapted to judge whether the QBER value and/or the working status of the classical channel has changed, and to control at least one variable optical attenuator and/or at least one amplifier to automatically adjust the attenuation of the variable optical attenuator and/or the gain of the amplifier such that the noise in the quantum channels is lower than a predetermined upper limit to allow secret key exchange, and such that the optical power value on a receiver side is within a predetermined range. Thus, the attenuation/amplification process is adjusted automatically.

According to a preferred embodiment of the invention, the active channel attenuation/amplification device further comprises a quantum channel monitoring device adapted to compute the QBER value and to send it to the processing unit through the first dedicated communication link.

Preferably, the active channel attenuation/amplification device further comprises a classical channel monitoring device adapted to compute a working status of a classical channel and to send it to the processing unit through the second dedicated communication link According to a preferred embodiment of the invention, the quantum channel monitoring device is a QKD emitter or a QKD receiver.

Preferably, the active channel attenuation/amplification device further comprising the at least one variable optical attenuator and/or the said amplifier.

Advantageously, the active channel attenuation/amplification device further comprises a plurality of variable optical attenuators located upstream the classical channel monitoring device and/or a plurality of amplifiers located downstream the classical channel monitoring device.

Preferably, the optical power is between −28 dBm and −3 dBm. Within this range, the QKD system works correctly.

A second aspect of the present invention relates to a QKD System Active combiner adapted to be installed at the output of an emitter in a QKD apparatus and comprising an active channel attenuation/amplification device according to the first aspect of the present invention, wherein said active channel attenuation/amplification device works as an attenuation device.

Preferably, the QKD System Active combiner comprises the quantum channel monitoring device.

A third aspect of the present invention relates to a QKD System Active splitter adapted to be installed at the input of a receiver in a QKD apparatus and comprising an active channel attenuation/amplification device according to the first aspect of the present invention, wherein said active channel attenuation/amplification device works as an amplification device.

Preferably, the QKD System Active splitter comprises the quantum channel monitoring device.

A fourth aspect of the present invention relates to a QKD apparatus comprising an emitter and a QKD System Active combiner according to the second aspect of the present invention, on an emitting side and a receiver and a QKD System Active splitter according to the third aspect of the present invention, on a receiving side, wherein the emitting side and the receiving side are connected through a classical communication fiber.

A fifth aspect of the present invention relates to an attenuation/gain method to be carried out in the QKD apparatus of the fourth aspect of the present invention, comprising the steps of processing, in the processing unit of monitoring data coming from the detector/monitor in order to estimate a signal intensity in a channel, comparing the signal intensity in channel with respect to an intensity range, and calculating the difference between the measured intensity and a desired intensity range value on said channel, modifying the gain of the optical amplifier and/or the attenuation of the variable optical attenuator to get the output intensity in the desired intensity range.

A sixth aspect of the present invention relates to QKD method to be carried out in the QKD apparatus of the fourth aspect of the present invention, comprising the steps of checking the status of the QKD systems, measuring a noise on QKD single photon detectors, determining if the measured noise imped the proper working of the QKD system, if yes, computing a reduction of classical channel power in fiber that needs to be applied to have a QBER value below the predetermined threshold, modifying the attenuation of variable optical attenuator and/or the gain of the amplifier in order to get the classical channel power in the fiber low enough for the proper working of the QKD system.

A seventh aspect of the present invention relates to active channel attenuation/amplification method to be carried out in the QKD apparatus of the fourth aspect of the present invention. Comprising the steps of identifying if the processing Unit at the QKD System Active Combiner or the Processing Unit at the QKD Active Splitter receives new data, if yes checking if the received data is related to the monitoring of the quantum channels, i.e. new data comes from QKD System, or of the classical channels, i.e. new data comes from detector/monitor, if said new data comes from detector/monitor carrying out the attenuation/gain process of the fifth aspect of the present invention, if said new data comes from QKD System carry out the QKD Process of the sixth aspect of the present invention.

The invention will now be described more in details in the following description of the preferred embodiments illustrated by the following figures that have an illustrative and non-limiting purpose.

FIGURES

DETAILED DESCRIPTION OF THE INVENTION

Figure 1:
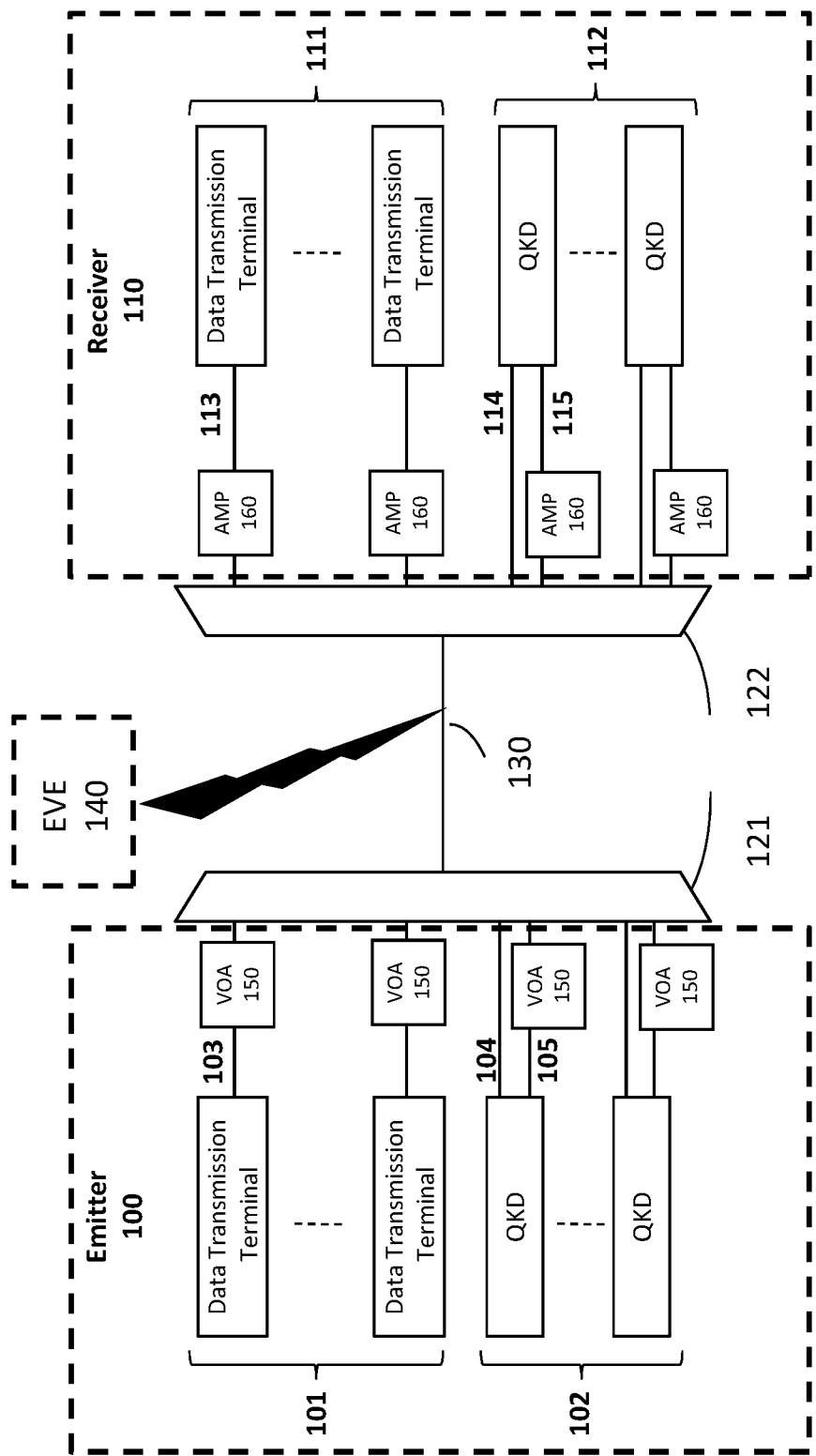
FIG. 1 represents a schematic view of an WDM-based Quantum Key Distribution apparatus of the prior art.
Figure 2:
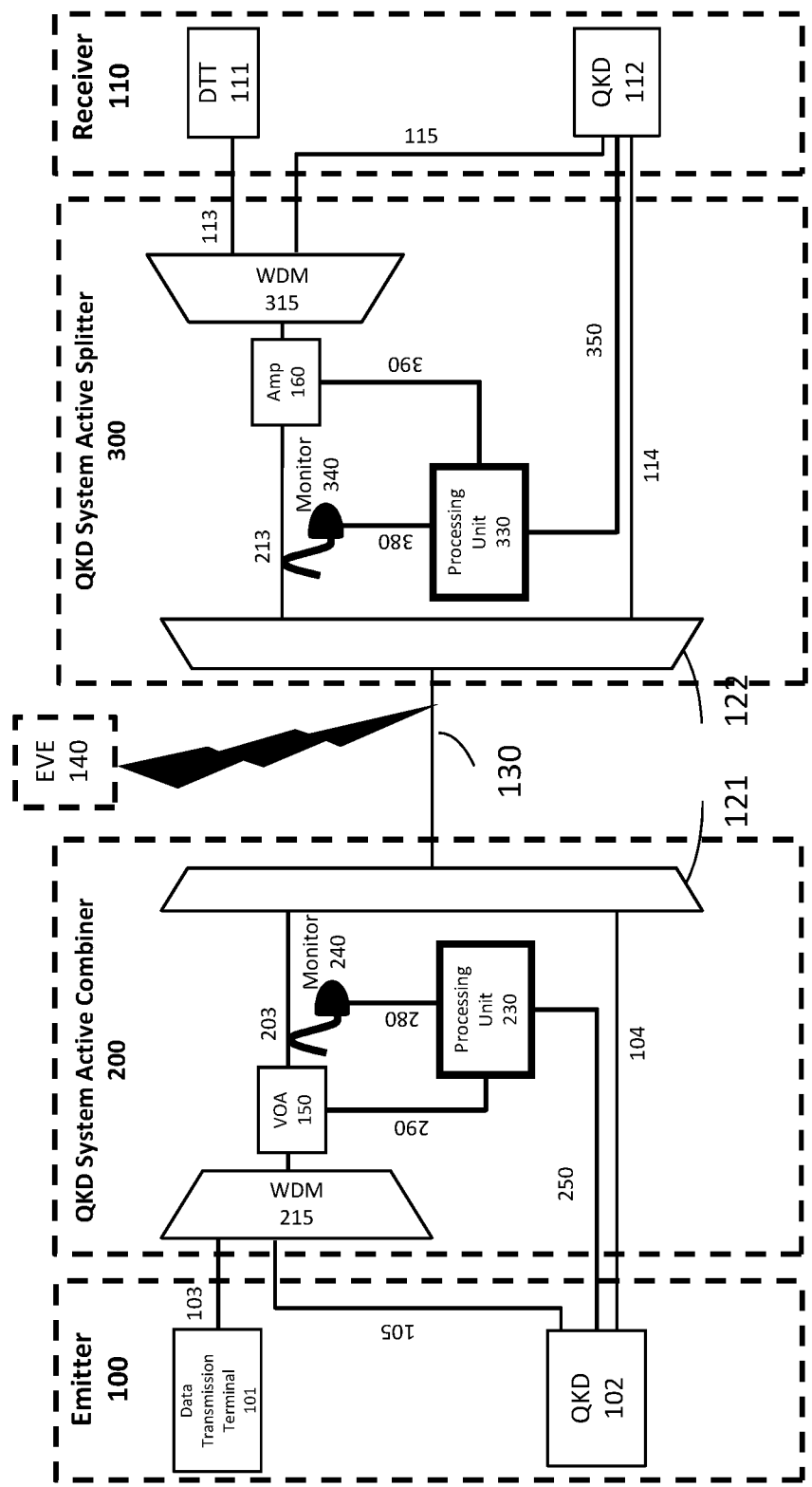
FIG. 2 represents a schematic view of WDM-based Quantum Key Distribution apparatus according to a first embodiment of the invention.

An embodiment of the invention is shown in FIG. 2. This embodiment is limited to the case where only one QKD system and one data transmission terminal pair share the same optical fiber. This simple case allows a clearer description of the invention. As shown in FIG. 2, the whole considered scenario comprises an emitter 100 and a receiver 110 as in the prior art (FIG. 1). In addition to these, it further comprises a device called QKD System Active combiner 200 placed at emitter 100 output and a device called QKD System Active Splitter 300 placed at receiver 110 input. QKD System Active combiner 200 and QKD System Active Splitter 300 are connected by an optical fiber 130.

The entire system, i.e. the QKD apparatus including the emitter, the receiver, the combiner and the splitter is an aspect of the invention. However, it is important to note that both the combiner and the splitter are, per se, aspects of the invention as well.

Generally speaking, the objective of the invention is to guarantee that the classical and quantum channels sharing the same optical fiber will work at any time in an autonomous manner. Of course, once the settings of attenuators 150 and optical amplifiers 160 have been tuned correctly, all the channels should work properly if there are no modifications of any of the communication channels. Therefore, the main activity of this invention is when, or just after, a change in the communication channels occurs. To this end, QKD System Active Combiner 200 and QKD System Active Splitter 300 roles are:

1) to collect data from the classical and quantum channels in order to verify if any change occurred or if there is any issue on one of those channels, 2) if any change or issue is detected QKD System Active Combiner 200 and Splitter 300 have to collaborate in order to change the settings so that all the channels are in a proper working state.

In order to be able to fulfill their objective, QKD Active Combiner 200 and Splitter 300 need processing units (230 and 330) that can collect data, process it and send instructions to other apparatuses. These processing units (230 and 330) can be made with a CPU for example.

In order to be able to fulfill the first role, processing units (230 and 330) need to be connected to channel monitoring devices. Any external monitoring device on a quantum channel will introduce errors in the quantum data flow by definition of QKD. Therefore, the monitoring devices for quantum channels are QKD emitter 102 and QKD receiver 112. They both collaborate together in order to compute the QBER value on the quantum channel. In our invention, this QBER value can be sent to the processing units (230 and 330) through dedicated communication links (250 and 350). These communication links (250 and 350) can be made of copper wires for example. There are several ways to monitor a classical channel in order to check if it is working properly or not. One can e.g. measure its optical power or measure its instantaneous Bit Error Rate. Any kind of classical channel monitoring requires a detection system, which collects a part of the optical signal of the channel under monitoring, and a pre-processing stage that will extract the expected monitoring value based on the measurement results of the detection system. The combination of those two functions is realized monitoring systems 240 or 340. The detection system can be made with an optical coupler that taps a portion of the classical channel light, and at least one optical sensor. The pre-processing stage can be made with analogic or digital electronics. Monitoring systems 240 and 340 are connected to processing units 230 and 330 respectively through communication links 280 and 380. The results of monitoring systems 240 and 340 are sent through these links 280 and 380 to processing units 230 and 330. Data received from the monitoring devices (102 and 112 for quantum channel or 240 and 340 for classical channels) is then processed by processing units 230 and 330 is order to verify if any monitoring signal has changed or if there is any issue on one of the channels.

In order to be able to fulfill the second role, the processing units (230 and 330) need to be connected to VOA 150 and optical amplifier 160. These connections 290 and 390 can be made with copper wires for example and are used to allow communication between processing units 230 and 330 and VOA 150 and optical amplifier 160 respectively. Via these communications, processing unit 230 is able to adjust the attenuation value of VOA 150 in such a manner that noise in the quantum channels due to the classical channels is low enough to allow the secret key exchange (i.e. the QBER value to be below a predetermined threshold value). In a similar way, the communications via communication link 390 allow processing unit 330 to adjust the gain value of optical amplifier 160 in such a manner that the classical channels work properly (i.e. that the optical power value on the receiver side is within a predetermined range). Therefore, if any change or issue has been detected by processing units 230 or 330, they can adjust the optical power level of the classical channels in such a way that all channels work correctly. If the two processing units 230 and 330 want to communicate together, they can do it through the service channel of the QKD systems 102 and 112. As can be seen in FIG. 2, the invention is located at the WDM multiplexing 121 and demultiplexing 122 stages. There are several options to integrate our invention within those stages. In FIG. 2, one presents the option where all classical channels are first multiplexed together with a first stage of WDM multiplexing 215 before being attenuated by VOA 150 and monitored by monitoring device 240 that taps a part of the light propagating in optical fiber 203. This optical fiber 203 links the first stage of WDM multiplexing 215 with final WDM multiplexing stage 121. In this option all classical channels are attenuated and monitored at once. Final WDM multiplexing stage 121 is used to combine the quantum and classical channels within the same fiber 130. A symmetric way to integrate the invention is shown in QKD active splitter 300. The first multiplexing stage is implemented with WDM splitter 122. This WDM splitter sends out all classical channels within the same optical fiber 213 whereas the quantum channel is send out in a dedicated fiber 114. All the classical channels are monitored with a single monitoring system 340 that taps a portion of the light in fiber 213, and then amplified by a single optical amplifier 160 located on fiber 213. All classical channels are then separated by the last WDM splitter stage 315. The output ports of this splitter 315 are connected to the receivers by the optical fibers 113 and 115.

Figure 3A:
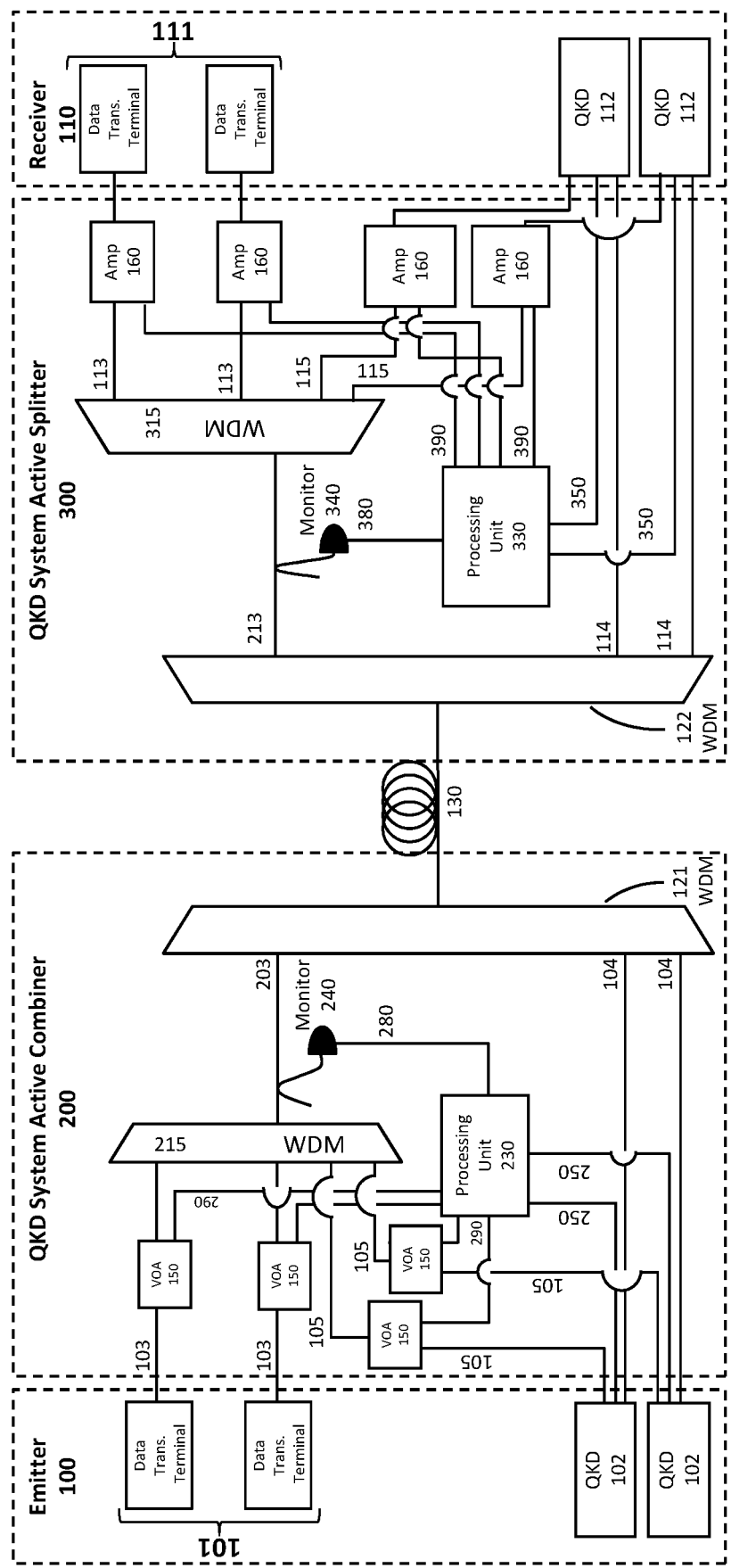
FIGS. 3a and 3b represent a schematic view of a WDM-based Quantum Key Distribution apparatus according to a second and a third embodiments of the invention.
Figure 3B:
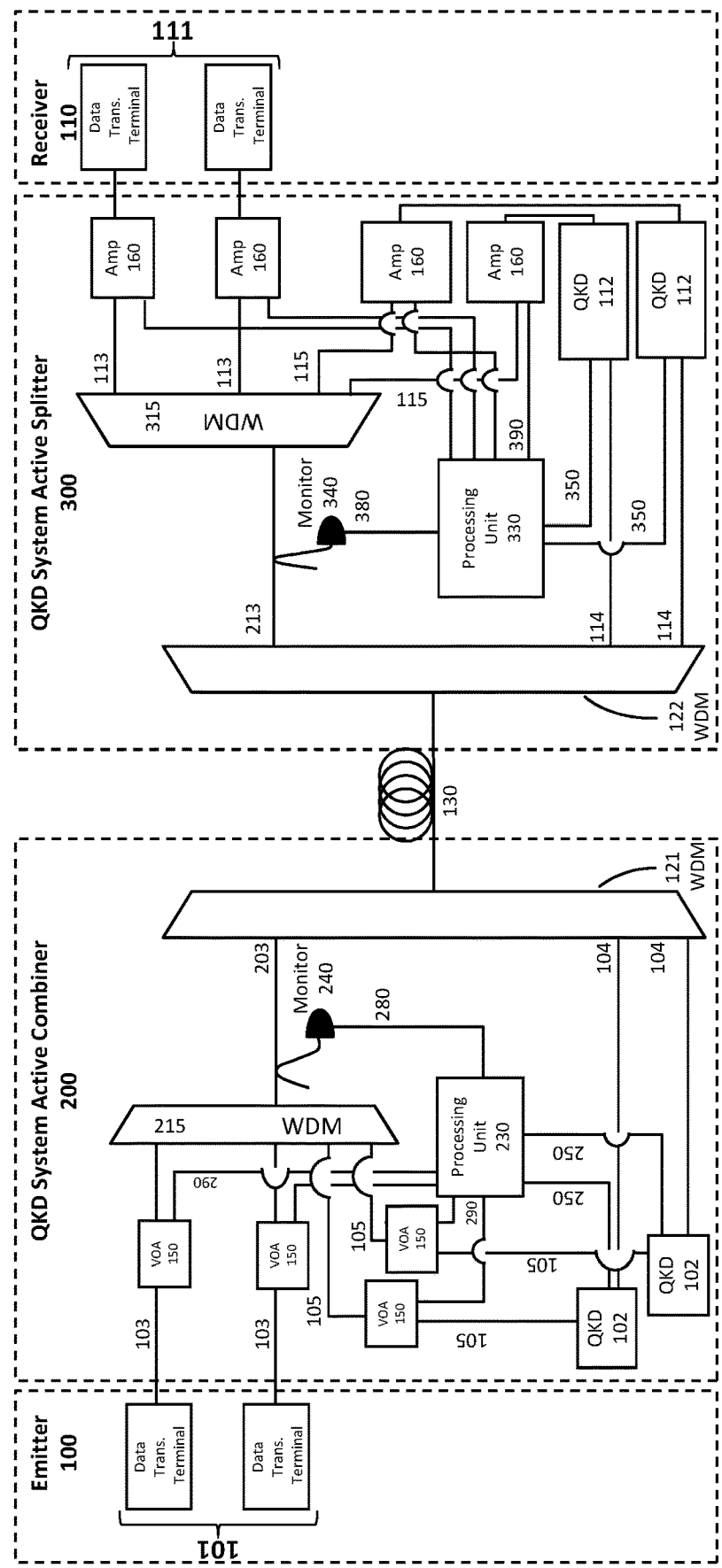

Alternatively, FIGS. 3a and 3b describe alternative embodiments.

As mentioned above, there are several options for the integration of the invention compare to the WDM stages. Especially, one can consider to monitor all classical channels at once, like in FIG. 2 or to monitor them separately. Moreover, the attenuation of the classical channels can be performed all at once, like in FIG. 2, or separately with several VOA's 150. The same considerations apply to the optical amplifiers 160, one of them can operate on all channels at once, or several amplifiers 160 can be used to amplify the classical channels. FIG. 3a shows one alternative to the option of FIG. 2. In this case, all classical communication channels are monitored at once by monitoring device 240 on the emitter side and by monitoring device 340 on the receiver side. This configuration is similar to the option shown in FIG. 2. The difference between FIG. 3a and FIG. 2 is the way the classical channels are attenuated and amplified. In FIG. 3a, there are as many VOA's 150 as classical channels. All of them are located on the optical fibers between the classical channel emitters and WDM multiplexer 215. Processing unit 230 can act on them separately or not. Furthermore, there are as many optical amplifiers 160 as classical channels in FIG. 3a. All amplifiers 160 are located on the optical fibers between WDM demultiplexer 315 and the classical channel receivers. Processing unit 330 can act on them separately or not.

By doing so, the system is capable of realizing a tunable and dedicated attenuation/gain variations on a specific channel.

FIG. 3b shows an alternative embodiment to the one of FIG. 3a where each QKD system 102 is inside the QKD System Active Combiner 200 and similarly each QKD system 112 is inside the QKD System Active Splitter 300. In that case QKD System Active Combiner 200 acts as a dynamic adapter of data and communication signal attenuation on channel 210. Likewise, QKD System Active Splitter 300 acts as a dynamic adapter of data and communication signal amplification on channel 310.

Figure 4:
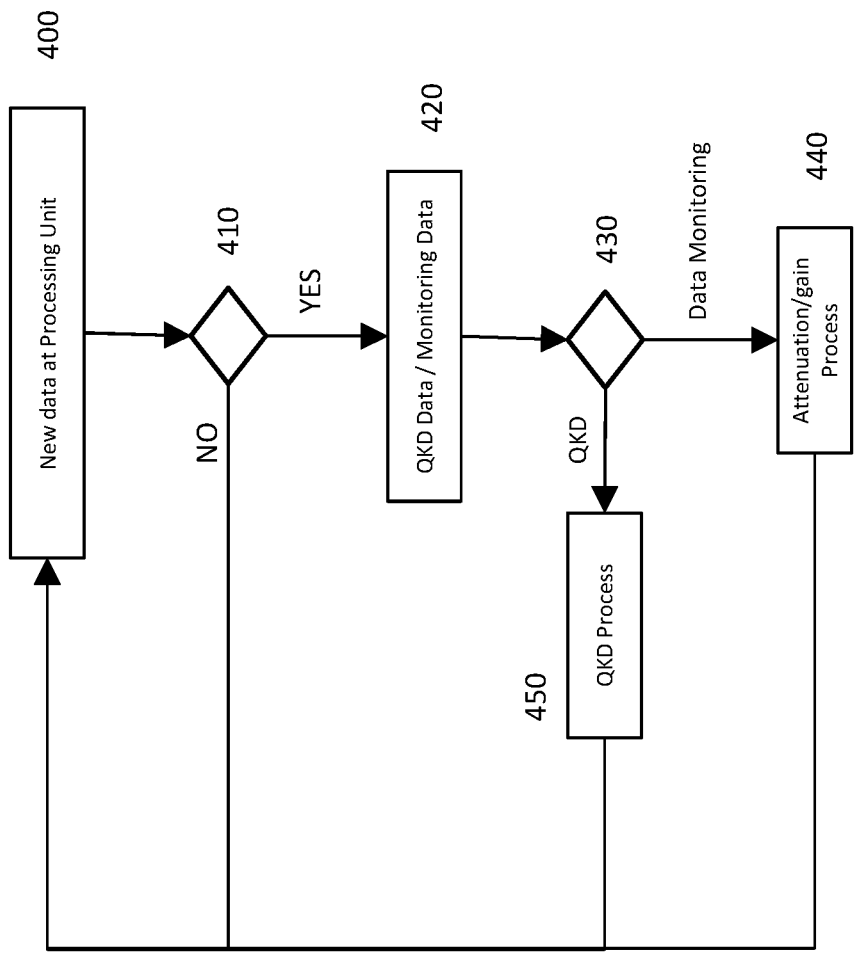
FIG. 4 is a block diagram representing a method according to a preferred embodiment of the invention.

FIG. 4 shows the overall method relating to the apparatus behavior while QKD and communication systems are operating. The main aspect of the method is to describe how QKD system active combiner 200 and QKD system active splitter 300 will interact with emitter 100, receiver 110 and main channel 130 in order to ensure data transmission and QKD process while a channel may be added or removed at emitter 100 or receiver 110.

First step 400 consists in identifying if processing unit 230 at QKD system active combiner 200 or processing unit 330 at QKD active splitter 300 receives a new data. If NO the step 410 redirect the processing units 230 or 330 to step 400, in other words the processing units wait for fresh data. If at least one of the processing units receives data, step 410 makes the processing units move to step 420. On one hand, said new data may be generated by monitoring system 240 or by QKD system 102, on the other hand said new data may be generated by the monitoring system 340 or by QKD system 112. Step 420 consists in checking if the received data is related to the monitoring of the quantum channels or of the classical channels.

If said new data comes either from monitoring systems 240 or 340, step 430 makes processing units 230 and 330 initiate step 440 defined as 'attenuation/gain process'. This step 440 is a whole process in itself that is presented in FIG. 5.

Figure 6:
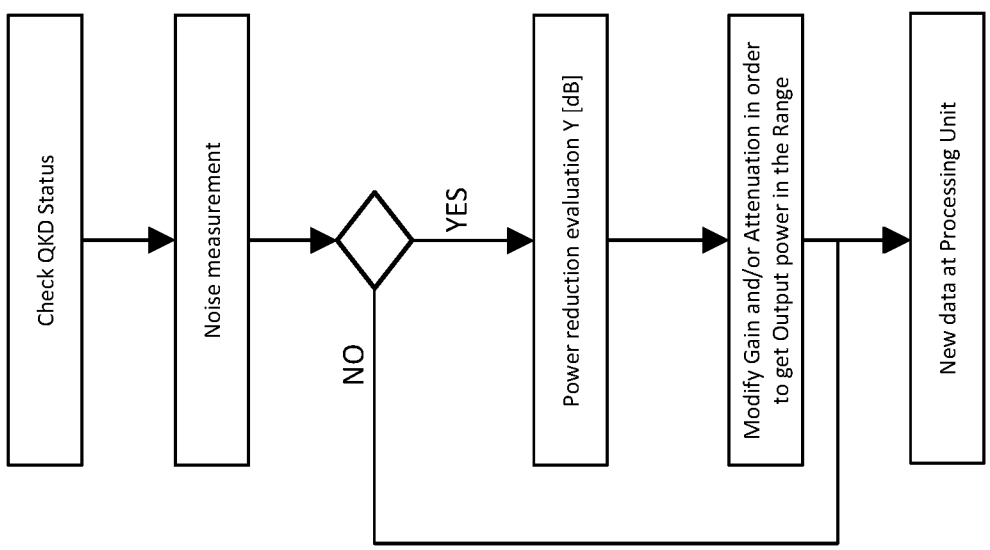
FIG. 6 is a block diagram representing a QKD process according to a preferred embodiment of the invention.

If said new data comes either from QKD systems 102 or 112, step 430 makes processing units 230 and 330 initiate step 450 defined as 'QKD Process' This step 450 is a whole process in itself that is presented in FIG. 6.

Figure 5:
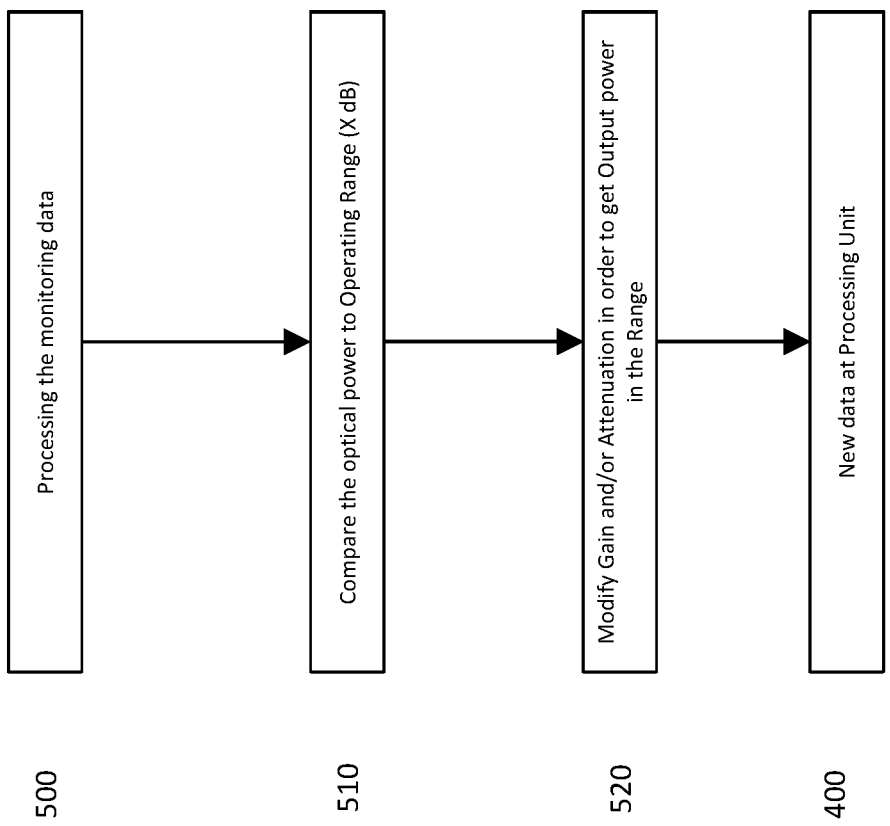
FIG. 5 is a block diagram representing a monitoring process method according to a preferred embodiment of the invention.

FIG. 5 represents the detailed method associated to the attenuation/gain process presented at step 440 of FIG. 4.

The process begins first by the processing of the monitoring data (step 500) in order to estimate the optical power of the classical channels. This process is done by the processing units 230 and 330 with the data coming from monitoring system 240 or monitoring system 340. The result of this step 500 is a measure of the signal intensity in channel 213. The second step 510 consists in comparing the signal intensity in the fiber 213 with respect to intensity range on the receiver side for the proper working of the classical channels. If the signal intensity is outside this range, the processing unit 330 calculates the difference between the measured output power at step 500 and the typical range value of the output power on channel 213. A typical range value for the signal intensity (or optical power) is between −28 dBm and −3 dBm. If the measured output power is outside the specified range, then last step 520 consists in modifying the gain of the optical amplifier 160 and the attenuation of the VOA 150 in order to get the output power in the specified range.

FIG. 6 represents the detailed method associated to the QKD process presented at step 450 of FIG. 4.

The process starts first with a QKD systems 102 and 112 status check (step 600). This step 600 consists in basic verification including for example the answers to the following questions: Is the system on? Are power supplies working properly? Is the connection of the service channel working well? This step 600 is then followed by a second step 610 which is specific to the noise that might be introduced by classical channels on quantum channel. Step 610 consists in a noise measurement of the QKD single photon detectors (this can be performed by activating the detectors without sending any quantum bits for example). At the end of step 610, the results of the status check and noise measurement performed by the QKD system are sent to processing units 230 and 330. Both processing units process those results and determine if the QKD system is in a state allowing it to run properly or not. This means that the additional noise introduced by the classical channels might lead to a QBER value that is above a predetermined threshold. If the noise introduced by classical channel is low enough to allow the proper working of the QKD system, step 620 makes processing units 230 and 330 move directly back to step 400. If the noise introduce by classical channel is too large to allow the proper working of the QKD system, step 620 makes processing units 230 and 330 move to step 630.

Step 630 consists in the computation by processing units 230 and 330 of the reduction of classical channel power in fiber 130 that needs to be applied to have a QBER value that will be below the predetermined threshold. This computed value is e.g. Y dB. Last step 640 consists in modifying the attenuation of VOA 150 and the gain of Amplifier 160 in order to get both, 1—the classical channel power in fiber 130 low enough for the proper working of the QKD system (i.e. to attenuate by at least a value of YdB) and 2—the optical power of the classical channels on the receiver side in the specified range for a proper working of the classical channels (i.e. to amplify by a gain value similar to the attenuation one (~YdB)). And then, processing units 230 and 330 move to step 400 and wait for new data.

The invention claimed is:

1. Active channel attenuation/amplification device to be implemented with a QKD apparatus, comprising:
   at least one processing unit adapted to receive a computed OBER value through a first dedicated communication link and a computed working status of a classical channel through a second dedicated communication link,
   said processing unit being adapted
   to judge whether the QBER value and/or the working status of the classical channel has changed, and
   to control at least one variable optical attenuator or at least one amplifier to automatically adjust the attenuation of the variable optical attenuator or the gain of the amplifier such that the noise in the quantum channels is lower than a predetermined upper limit to allow secret key exchange, and such that an optical power value on a receiver side is within a predetermined range.

2. Active channel attenuation/amplification device according to claim 1, further comprising a quantum channel monitoring device adapted to compute the QBER value and to send it to the processing unit through the first dedicated communication link.

3. Active channel attenuation/amplification device according to claim 1, further comprising a classical channel monitoring device adapted to compute a working status of a classical channel and to send it to the processing unit through the second dedicated communication link.

4. Active channel attenuation/amplification device according to claim 2, wherein the quantum channel monitoring device is a QKD emitter or a QKD receiver.

5. Active channel attenuation/amplification device according to claim 1, further comprising the at least one variable optical attenuator or the said amplifier.

6. Active channel attenuation/amplification device according to claim 3, further comprising a plurality of variable optical attenuators located upstream the classical channel monitoring device or a plurality of amplifiers located downstream the classical channel monitoring device.

7. Active channel attenuation/amplification device according to claim 1, wherein the optical power is between −28 dBm and −3 dBm.

8. Active channel attenuation/amplification device of claim 1 further associated with a QKD System Active combiner adapted to be installed at an output of an emitter in a QKD apparatus, wherein said active channel attenuation/amplification device works as an attenuation device.

9. Active channel attenuation/amplification device according to claim 8, comprising a quantum channel monitoring device.

10. Active channel attenuation/amplification device of claim 1 associated with a QKD System Active splitter adapted to be installed at an input of a receiver in a QKD apparatus, wherein said active channel attenuation/amplification device works as an amplification device.

11. Active channel attenuation/amplification device according to claim 10, comprising a quantum channel monitoring device.

12. The Active channel attenuation/amplification device according to claim 8, incorporated into a QKD apparatus comprising an emitter on an emitting side, and a receiver and a QKD System Active splitter adapted to be installed at the input of a receiver in the QKD apparatus and comprising an active channel attenuation/amplification device, wherein said active channel attenuation/amplification device works as an amplification device, the receiver and the QKD System Active splitter on a receiving side, wherein the emitting side and the receiving side are connected through a classical communication fiber.

* * * * *